Figure 1:
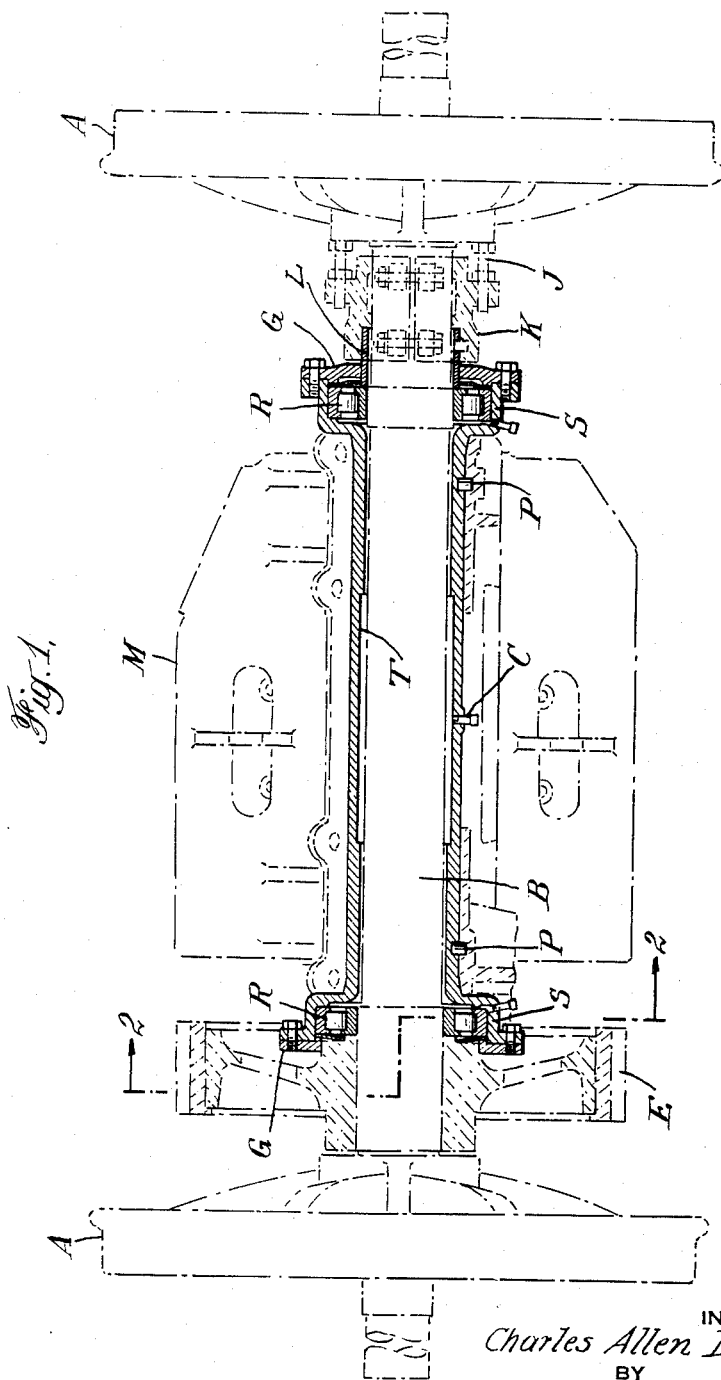

March 4, 1941.    C. A. BARTON    2,234,070
SUSPENSION MEANS FOR THE DRIVING MOTORS IN
ELECTRIC TRACTION VEHICLES
Filed March 30, 1938    2 Sheets-Sheet 1

INVENTOR
Charles Allen Barton
BY
Pennie Davis Marvin & Edmonds
ATTORNEYS

March 4, 1941.   C. A. BARTON   2,234,070
SUSPENSION MEANS FOR THE DRIVING MOTORS IN
ELECTRIC TRACTION VEHICLES
Filed March 30, 1938   2 Sheets-Sheet 2

INVENTOR
Charles Allen Barton
BY
ATTORNEYS

UNITED STATES PATENT OFFICE 2,234,070

SUSPENSION MEANS FOR THE DRIVING MOTORS IN ELECTRIC TRACTION VEHICLES

Charles Allen Barton, Rio de Janeiro, Brazil

Application March 30, 1938, Serial No. 198,975
In Brazil April 1, 1937

3 Claims. (Cl. 105—113)

The present invention relates to suspension means for the driving motors in electric traction vehicles.

The main object of the invention is to provide an improved contrivance by means of which it shall be possible as a practical solution to apply roller bearings to the driving axles of electrically propelled vehicles, in so far as concerns those particular bearings the function of which is to carry part of the weight of the traction motor and part of the pressure developed by the gears.

The well known advantages of such bearings, has made it a universal practice to equip all electric traction vehicles with roller bearings in connection with the bearings supporting the weight of the vehicle proper and the armature bearings of the motors.

When it comes, however, to those bearings which are used on the driving axles of such vehicles for the purpose of supporting part of the weight of the motor and part of the pressure of the gearing, no satisfactory solution has up to the present been proposed for the practical application of roller bearings. A practical and satisfactory solution of this problem, however, is accomplished by the present invention, as will be seen from the description thereof hereunder.

By thus permitting the use of roller bearings for the above mentioned purpose, the present invention presents among others the following important advantages:

Decrease of electrical energy consumption;
Decrease in maintenance expenses;
Decrease in lubrication expenses;
Reduction of noises;
Increase in acceleration;
Increase of average speed.

The reason why it is necessary to use bearings on the driving axles of electric traction vehicles for carrying part of the weight of the traction motor and part of the pressure of the gearing is well known, but for the sake of clearness a brief review of the subject may be found desirable at this point.

In the operation of electric traction vehicles, experience has demonstrated, on the one side, the necessity of mounting the driving motors with spring suspension, and on the other side, the great advantage of gearing the motor directly to the driving axle, the last mentioned advantage being such that it has become the universal practice in such vehicles, with complete elimination of intermediate flexible connections. Such direct gearing of the motor axle to the axle of the driving wheels, however, makes it necessary to main absolutely constant the distance between the respective axles for a satisfactory operation of the gears. For accomplishing this result, it has become the universal practice to mount that end of the motor adjacent the axle of the driving wheels on bearings arranged on this said axle, the far end of the motor being then mounted with a spring suspension at a suitable point of the vehicle frame or truck as the case may be. This arrangement permits the oscillations of the motor, due to its spring suspension, at the same time that it ensures the maintenance of a constant distance between the gear centers.

These are the bearings with which the present invention is particularly concerned, which bearings, as is evident, have for their function to carry part of the weight of the motor and part of the pressure of the gearing.

Up to the present, however, a number of practical factors well known to those familiar with the art have made it practically impossible to use roller bearings at these points of the driving axles, for the purpose mentioned. As already stated, this is the very problem for which the present invention provides a proper and satisfactory solution.

For the sake of clearness, the invention will be described below in connection with a particular and preferred embodiment thereof as applied to a tramway car, which is illustrated in the accompanying drawings, said particular description and illustration being given by way of example only, without any limitation as to the scope o the invention.

Figure 2:
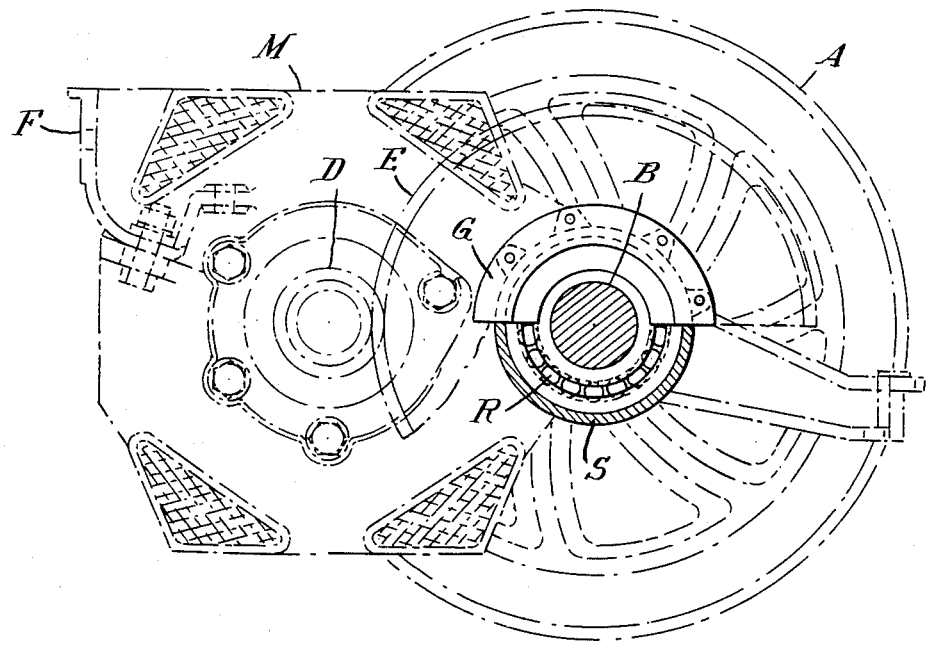

In the drawings:

Fig. 1 is a front elevation, partly in section, showing the device of the present invention as applied in a tramway car; and Fig. 2 is a sectional view taken along the line 2—2 of Fig. 1.

Referring to the drawings, the traction wheels A—A mounted on the driving axle B are driven from the electric motor M through a pinion D, mounted on the motor shaft, and a gear E mounted on the axle B of the traction wheels. The driving motor M is spring suspended at the end F thereof away from the axle B, while the end of the motor adjacent the axle B is fixed directly to the device of the present invention in a manner to be described hereunder, after a more detailed description of the invention proper has been made.

The device of the present invention, for the mounting of the roller bearings with which the invention is particularly concerned, comprises a tube T of suitable material, preferably cast steel, which terminates at each extremity with a bell like expansion such as illustrated at S—S, said tube being applied over the axle B of the traction wheels so as to enclose the said axle. The shape of the tube S—T—S, and its adjustment over the axle B, give the device the appearance of an axial double bell, as is seen from Fig. 1. The bell like expansions S—S at either end of the tube T serve as boxes for lodging the roller bearings R—R, and by their bottom surfaces they at the same time fix these said bearings in position longitudinally of the axle, the tube T having the proper length for the bell mouths S—S to fix the roller bearings R—R in the exact position they are to occupy on the axle B. To keep the bearings R—R against outward movement in their boxes or housings, S—S, there are provided the stop plates G—G which are fixed by suitable screws to the bell mouths, as shown in the drawings, the action of stop plates G—G being assisted, on the gear side by the gear proper E, and on the side opposite to the gear by a sheath piece L and collar K. The collar K is preferably made up of two halves connected together by means of screws, as shown in Fig. 1, while other screws J permit of adjusting the collar in its correct position over axle B. This arrangement enables the tube T and roller bearings R—R to be easily mounted over the axle B from the end opposite the gear E. The internal diameter of the tube T is slightly larger than the diameter of the axle B, and the tube T is mounted on the roller bearings R—R, applied over axle B, in such manner that tube T is kept independent from the axle B, except as for their mutual connection through the said roller bearings R—R. The end of the motor M adjacent the tube T is attached to the latter by means of supporting lugs on the motor casing, connected to the tube by means of pins P—P, Fig. 1. The tube T is thus a stationary or fixed tube, in the sense that it does not follow the rotative movement of the driving axle B, but the said tube T is in reality a movable or oscillating tube, in the sense that it is free to oscillate on roller bearings R—R, thus permitting oscillations of the motor M arising from the spring suspension of the latter at its far end F.

From the foregoing description, it can be seen that the device of the present invention makes possible the use of roller bearings R—R for the function of carrying part of the weight of the motor and part of the pressure of the gearing, and at the same time the distance between the centres of the gears D, E is kept constant since the connection between the motor M and the tube T is an inextensible connection, which is thus accomplished without impairing the freedom of the motor M to oscillate in consequence of the spring suspension of the latter at the far end F thereof.

The tube T not only enables the mounting of the roller bearings R—R on the axle B for the purpose of carrying part of the weight of the motor and part of the pressure of the gearing, but by arranging the said bearings R—R in the form of a single continuous and rigid unit, it also ensures a practically uniform distribution over the said bearings R—R of the said weight and pressure, and it further eliminates the undesirable torsional strains which, without the use of such tube, would occur between the bearings R—R and the axle B, longitudinally of the latter.

The above mentioned space which is left between the axle B and the tube T, is preferably filled up with lubricating grease, and preferably, a grease cup C, Fig. 1, is also arranged on the tube T, in a proper position for easy filling when in service.

The device of the present invention has the further important advantage that it prevents the oil and grease getting mixed together, a condition which it was practically impossible to obtain with the ordinary plain bearings as heretofore used over the driving axle B for the mounting of the motor M. As a matter of fact, since the bearings are mounted quite close to the gear E and pinion D, and since the said ordinary plain bearings were lubricated with oil, while gear E and pinion D are lubricated with grease, it is clear that it would be extremely difficult to prevent said oil and grease from getting mixed together, with a consequent depreciation of both oil and grease. This serious disadvantage is positively eliminated with the use of the device of the present invention which includes the roller bearings.

As stated above, the preferred embodiment of the invention particularly described hereinabove and illustrated in the accompanying drawings, is given by way of example only, for the sake of clearness and without limitation on the scope of the invention, as it is evident that many modifications may be introduced by those familiar with the art, without departing from the fundamental spirit and scope of the invention.

Having now particularly described the nature of my said invention and the manner in which the same is to be performed, I claim as my invention:

1. A motor mounting and driving-axle assembly for electric traction vehicles comprising a driving axle, an elongated cylindrical member surrounding said axle and terminally expanded at both ends into cylindrical portions of larger diameter, the central portion of said elongated cylindrical member being of a diameter such that it may move freely about said axle, roller bearings disposed about the axle and within the annular spaces defined by the axle and the terminally expanded end portions of said elongated cylindrical member, said roller bearings forming the sole supporting connection between said elongated cylindrical member and the axle, a driving motor for the axle separate from the cylindrical member mounted on said cylindrical member with its axis parallel to said axle, a gear on said axle, a pinion driven by the motor for driving said gear, and means for yieldingly supporting the side of the motor opposite from the cylindrical member, whereby said bearings support a portion of the weight of the motor and absorb a portion of the pressure of the driving gear and said motor may oscillate about said axle as a center.

2. A motor mounting and driving-axle assembly for electric traction vehicles comprising a driving axle, an elongated cylindrical member surrounding said axle and terminally expanded at both ends into cylindrical portions of larger diameter, the central portion of said elongated cylindrical member being of a diameter such that it may move freely about said axle, roller bearings disposed about the axle and within the annular spaces defined by the axle and the terminally expanded end portions of said elongated cylindrical member, said roller bearings forming the sole supporting connection between said elongated cylindrical member and the axle, means for fixing said elongated cylindrical member longitudinally of the axle and simultaneously cooperatively with said member fixing the position of said roller bearings longitudinally of the axle, a driving motor for the axle separate from the cylindral member mounted on said cylindrical member with its axis parallel to said axle, a gear on said axle, a pinion driven by the motor for driving said gear, and means for yieldingly supporting the side of the motor opposite from the cylindrical member, whereby said bearings support a portion of the weight of the motor and absorb a portion of the pressure of the driving gear and said motor may oscillate about said axle as a center.

3. A motor mounting and driving-axle assembly for electric traction vehicles comprising a driving axle, an elongated cylindrical member surrounding said axle and terminally expanded at both ends into cylindrical portions of larger diameter, the central portion of said elongated cylindrical member being of a diameter such that it may move freely about said axle, roller bearings disposed about the axle and within the annular spaces defined by the axle and the terminally expanded end portions of said elongated cylindrical member, said roller bearings forming the sole supporting connection between said elongated cylindrical member and the axle, closure members for fixing cooperatively with the expanded cylindrical member the position of the roller bearings longitudinally of the axle and for preventing foreign material from entering the expanded members, means for releasably fixing the cylindrical member longitudinally of the axle between the vehicle wheels, a driving motor for the axle separate from the cylindrical member mounted on said cylindrical member with its axis parallel to said axle, a gear on said axle, a pinion driven by the motor for driving said gear, and means for yieldingly supporting the side of the motor opposite from the cylindrical member, whereby said bearings support a portion of the weight of the motor and absorb a portion of the pressure of the driving gear and said motor may oscillate about said axle as a center.

CHARLES ALLEN BARTON.